United States Patent
Gabriel

(10) Patent No.: US 7,214,052 B2
(45) Date of Patent: May 8, 2007

(54) INJECTION-MOLDING TOOL FOR THE PRODUCTION OF DISC-SHAPED INFORMATION CARRIERS

(75) Inventor: Markus Gabriel, Rombach (CH)

(73) Assignee: AWM Mold Tech AG, Muri (CH)

( * ) Notice: Subject to any disclaimer, the term of this patent is extended or adjusted under 35 U.S.C. 154(b) by 0 days.

(21) Appl. No.: 11/320,344

(22) Filed: Dec. 28, 2005

(65) Prior Publication Data

US 2006/0147576 A1    Jul. 6, 2006

(30) Foreign Application Priority Data

Jan. 6, 2005    (CH) ..................... 0018/05

(51) Int. Cl.
*B29D 11/00*    (2006.01)
(52) U.S. Cl. .................. 425/542; 425/810; 264/1.33
(58) Field of Classification Search ............. 425/542, 425/810; 264/1.33, 106, 107
See application file for complete search history.

(56) References Cited

U.S. PATENT DOCUMENTS

| | | | |
|---|---|---|---|
| 5,018,962 A | 5/1991 | Kitamura et al. | |
| 2002/0031570 A1* | 3/2002 | Gabriel | 425/542 |

FOREIGN PATENT DOCUMENTS

| | | |
|---|---|---|
| DE | 44 10 015 A1 | 10/1994 |
| EP | 0 899 075 A1 | 3/1999 |
| EP | 1 120 221 A1 | 9/2000 |
| JP | 2000-048416 A | 2/2000 |
| WO | WO 99/37471 A1 | 7/1999 |

* cited by examiner

*Primary Examiner*—Donald Heckenberg
(74) *Attorney, Agent, or Firm*—The Webb Law Firm

(57) ABSTRACT

An injection molding tool is described for the production of disc-like information carriers, in particular in the form of CD's and/or DVD's. The injection molding tool has a first and a second mirror block which form the cavity and which are located opposite to each other and which, for allowing an opening and a closure of the cavity, are movable relative to each other. In addition to that it has a form ring which encloses the first mirror block concentrically, and which borders the cavity towards its outer edge, and which is movable relative to the first mirror block, wherein between the first mirror block and the form ring enclosing it a sliding ring is provided for the reduction of friction if the form ring moves relative to the first mirror block. Optimal in respect of the reduction of friction of the motion and without problems in view of maintenance such an injection molding tool can be improved if the sliding ring is concentrically located between the first mirror block and the form ring enclosing it, as well as in addition to that at least one additional bearing located concentrically between the first mirror block and the form ring enclosing it, in particular in the form of a cage ball bearing.

25 Claims, 4 Drawing Sheets

INJECTION-MOLDING TOOL FOR THE PRODUCTION OF DISC-SHAPED INFORMATION CARRIERS

TECHNICAL FIELD

Figure 1:
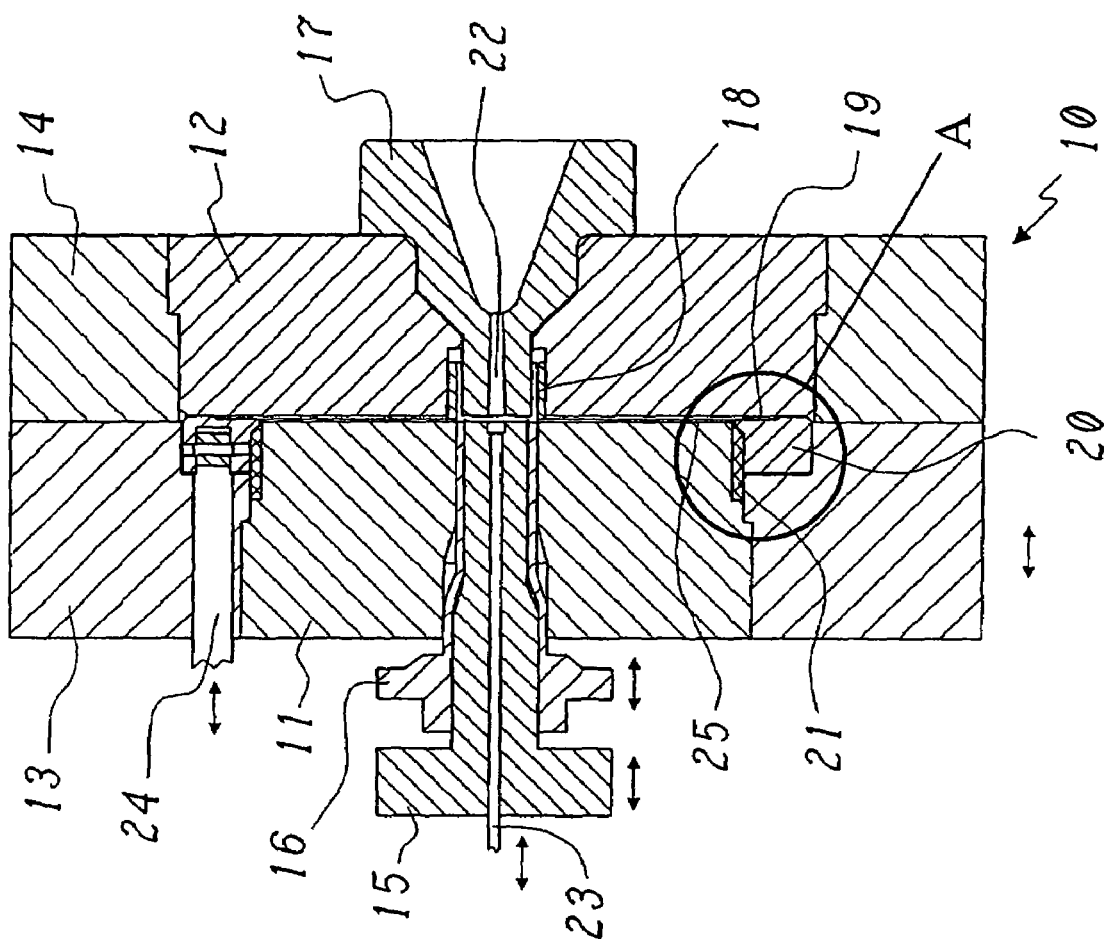

The present invention relates to the field of injection-molding technique. It in particular relates to an injection-molding tool for the production of disc-shaped information carriers like CD's DVD's or the like. Such an injection-molding tool comprises, for the formation of a cavity, a first and a second mirror block, which are located opposite to each other, and which, for opening and closure of the form, are movable relative to each other, as well as a form ring, which concentrically encloses the first mirror block and encloses the cavity towards its outer border, and which is movable relative to the first mirror block. Between the first mirror block and the form ring enclosing the mirror block there is provided means for the reduction of friction if the form ring moves relative to the first mirror block.

BACKGROUND OF THE INVENTION

For the production of optically readable information carriers like Audio-CD's, CD-ROM's, Video-CD's or DVD's injection-molding tools are used, which, by means of two opposing and relatively movable mirror-blocks form a cavity (cavity of the injection-molding form). On one of the two mirror blocks there is usually provided a thin, disc-shaped stamper in a removable manner, which during injection-molding of the information carrier embosses the information carrier traces in the information carrier. At its outer border the cavity is usually bordered by a form ring (venting ring), which surrounds the mirror block concentrically.

The form ring protrudes above the planar surface of the form of the mirror block it surrounds, and it is movable relative to this mirror block in axial direction. If the cavity is closed by means of an axial motion of the two mirror blocks towards each other, due to the protruding position of the form ring it contacts the opposing mirror block and closes the form, while the mirror block it encloses concentrically is at a predetermined distance from the other mirror block. The hot plastic is injected under high pressure into the thus provided disc-shaped cavity. After the cavity is filled, the mirror block which is enclosed by the form ring is moved a little towards the other mirror block in order to achieve a high quality of the information carrier, while the form ring remains stationary (see e.g. FIGS. 2 and 3 of WO-A1-99/37471).

This relative motion taking place in this phase of the production process between the mirror block and the form ring enclosing it however gives raise to problems for the following reasons: to make sure that the form ring can slide freely over the mirror block during the relative motion, a certain fit is necessary. If this fit is too loose, during injection plastic may enter the slot and lead to a fin on the formed information carrier disc, which is not desired. If however the fit is too tight, it may, in particular if the mirror block and the form ring are at different temperatures, lead to high values of friction which limit the relative motion, and, because both parts are usually made of steel, may even lead to seizing or jamming of the form ring on the mirror block.

In order to have low friction at relatively tight fit between the mirror block and the form ring in the above mentioned WO-A1-99/37471 it has already been proposed to provide the surfaces of the mirror block and of the form ring which are gliding on each other with a specific coating, which reduces the friction. In this context it is however a disadvantage that the coating of the parts is associated with high expenses, and a coating generally influences the heat dissipation from the cavity.

In EP-A1-0 899 075 a linear ball bearing (75 in FIG. 5) is provided between the two parts in order to assure a good relative mobility between the mirror block and the ring which concentrically surrounds the mirror block. The ring in this case however is not a form ring which forms part of the bordering of the cavity, but it is a guiding ring which only provides centering of the two mirror blocks relative to each other.

In U.S. Pat. No. 5,018,962 an injection molding tool comprising two mirror blocks and a form ring for the production of CD's is disclosed, in which between the form ring and one of the mirror blocks a concentric holding ring (15 in FIG. 1) is provided for the stamper which is sitting on this mirror block. The form ring slides over both mirror blocks if the form is opened or closed. There is however no means provided for the reduction of friction during these sliding processes.

In DE-A1-44 10 015 the possibility is described to provide a bearing between the form ring and the mirror block which it encloses (61 in FIG. 1). How this bearing is actually structured is however not disclosed in this document, there is only the statement that it is a cylindrical bearing, which apparently shall serve to simplify the relative mobility between a movable part of the form half 52 (corresponding to a mirror block) and a swimming element 58 (probably corresponding to a form ring). This "bearing" is provided in a region distanced from the cavity, and the swimming element is in direct contact with the movable form half in the bordering region to the cavity.

In EP-A1-1 120 221 the possibility is disclosed to provide a sliding ring between a mirror block and a form ring which is enclosing this mirror block concentrically, wherein this sliding ring is provided concentrically between the mirror block and the form ring enclosing it. This sliding ring is provided to prevent direct friction between the mirror block and the form ring.

SUMMARY OF THE INVENTION

Correspondingly it is one object of the invention to provide an improved injection molding tool for CD's or DVD's. In particular an injection molding tool shall be improved, which, for the formation of a cavity, comprises a first and a second mirror block which are located opposite to each other, and which, for the opening and closure of the form, are movable relative to each other, as well as a form ring which concentrically encloses the first mirror block and which borders the cavity towards its outer edge, and which is movable relative to the first mirror block. Between the first mirror block and the form ring enclosing it means are provided for the reduction of friction if the form ring moves relative to the first mirror block.

This object is achieved in that the means for the reduction of friction, if the form ring moves relative to the first mirror block, on the one hand comprises at least one sliding ring which is provided concentrically between the first mirror block and the form ring enclosing it, as well as on the other hand at least one additional bearing which is provided concentrically between the first mirror block and the form ring enclosing it.

One key element of the invention correspondingly is to provide two different means for the reduction of friction if the form ring moves relative to the first mirror block. This will not be considered by a person skilled in the art in the first place, since there is very little room in such injection molding forms, and since in view of maintenance as well as production costs the number of individual components, in particular of individual movable components, always should be kept at a minimum.

Surprisingly however, it can be shown that the combination of a form ring with an additional bearing, wherein those two are located one behind the other in an axial direction of the cavity, provides particularly advantageous synergistic effects.

So on the one hand a sliding ring, who may provide accurate and precise transitions between the mirror block and the sliding ring as well as between the form ring and the sliding ring, can only be mounted with difficulty due to the associated low tolerances of the radii (wear of the edges and damages of the edges during mounting), and the sliding ring is, if it shall take over the full guidance between the form ring and the mirror block, very often overstrained, which leads to a quick wear and an increased maintenance. If the sliding ring shall not jam during the relative motion of form ring and mirror block, a certain allowance or play is always necessary, on the other hand this allowance is disadvantageous in respect of precise transitions between borders.

On the other hand a conventional bearing, e.g. in the form of a ball bearing or a cage bearing, respectively, is almost optimal in respect of the guidance, because it substantially provides free from play guidance, it has a high carrying capacity over long times and large strokes, on the other hand it is within the nature of such a bearing that it typically has rather large slot widths at the transitions between the borders of the mirror block and the form ring, as these are required since such a bearing may not be used for the limitation or confinement of the cavity without substantial fins being produced on the information carrier.

The as such laborious combination of the two elements sliding ring and bearing however now combines the advantages of each of the elements, and it may, in particular if dimensioned and rated and relatively oriented properly, eliminate the individual disadvantages substantially completely.

Correspondingly, according to a first preferred embodiment of the injection molding tool according to the invention, the sliding ring is provided in a region bordering the cavity, namely in the region, where the low slot widths, which are possible if a sliding ring is used, are particularly necessary, and where the possibilities for contouring of the edge regions of the molded article shall be given. On the other hand the further bearing is provided in a region which is not bordering the cavity and which is axially farther from the cavity, and it may there take over a substantial part or almost the full guidance between the form ring and the mirror block, and thus so to speak in relation of the guiding disburden the sliding ring at least partially. A sliding ring may then be fit in an even more precise geometrical manner, since the further bearing assures a guidance free from play and thus prevents jamming of the sliding ring or even makes it impossible.

In addition to that there is the advantage that during mounting of the form ring on the mirror block from the side of the cavity at first the further bearing, which typically has a slightly larger play in relation of the diameter, is inserted, this further bearing then takes over the guidance function during the further shifting onto the mirror block, and thus makes sure that at the moment of touching and encompassing of the sliding ring around the mirror block and of the form ring around the sliding ring, respectively, already a perfect relative orientation of sliding ring and form ring, and mirror block, respectively, is present. Like that damages in the edge regions, which at the end lead to bad injection molding forms, can be prevented during mounting almost completely.

In this context it can, in accordance with a further preferred embodiment, be advantageous to provide the sliding ring and the further bearing in radially stepped manner. In view of the process of assembling in can be shown to be ideal, if the first mirror block comprises a first radius in a first axial region which is located adjacent to the cavity, and with a second radius, which is located in an axial region farther to the cavity, wherein the first radius is smaller than the second radius. The sliding ring is thereby provided around the first axial region, and the further bearing around the second axial region. Due to the larger second radius of the region, in which the further bearing is located, it is made sure that upon mounting of the form ring the circumferentially circular outer edge of the planar surface of the mirror block (or the outer edge of the sliding ring, if this is already mounted on the mirror block), which is opposite to the stamper, is not damaged. This due to the fact that the radius of this outer edge is smaller than the larger second radius, and due to the fact that correspondingly during mounting there is provided enough play and that the accurate fit between the sliding ring and the outer edge (or between the sliding ring and the form ring, respectively) is only introduced if the further bearing already provides a guidance between the form ring and the first mirror block.

A further preferred embodiment is characterised in that the sliding ring has an outer diameter, which substantially corresponds to the outer diameter of the cavity, how it is defined by the inner diameter of the form ring, and that the thickness (in radial direction) of the sliding ring is smaller than the difference between the first radius and the second radius. Preferably, the sliding ring has a thickness in the range of 0.25–2 mm, preferably of 0.35–1 mm. Further preferably the difference (in absolute values) between the first radius and the second radius is in the range of 0.5–10 mm, preferably in the range of 1–7.5 mm.

These absolute measures (as well as the absolute measures given further below) are relating to the conditions of production of CD's or DVD's respectively, that is for molded articles with a diameter of 80–130 mm and a thickness in the range of approximately 0.3–2 mm.

In view of having ideal conditions for the assembling of the form ring it is advantageous if the first axial region has a height (in axial direction) which is smaller than the height of the second axial region in axial direction. For example the first axial region may have a height (in axial direction) in the range of 2.5–15 mm, preferably in the range of 5–10 mm. The second axial region may have a height (in axial direction) in the range of 10–30 mm, preferably in the range of 15–20 mm.

According to a preferred embodiment the further bearing may, as already mentioned, be a roller bearing, wherein barrel roller bearings, spherical roller bearings, bearings or ball bearings can be used, the latter in particular preferably consisting of a ball cage with balls supported therein. This further bearing preferably has a thickness in the range of 1–5 mm, preferably in the range of 1.5–3 mm.

In view of the sliding ring it is advantageous to produce this using a material which reduces sliding friction (which if need be also shows a good heat conductivity), preferably it is made of copper, a copper alloy like bronze or also of a plastic material like Teflon. The same may possibly also be advantageous for the ball cage of the further bearing.

The first mirror block borders the cavity preferably with a substantially planar surface, and the sliding ring abuts with its front face facing the cavity flush with the planar surface of the first mirror block and enlarges it radially outwards. However, also specific shapings of the edge of the molded article are possible, so for example in that the sliding ring is provided with a chamfer on its front edge facing the cavity such that the information carrier produced in the cavity also has a chamfer on its outer edge, and/or in that the sliding ring is provided on its front edge facing the cavity with a circumferential recess, such that the information carrier is provided with a protruding ring shaped scratch protection on its outer edge. Typically, the sliding ring as well as the further bearing is provided on the mirror block. The sliding ring and/or the further bearing may be coated with a coating reducing the friction.

Further preferred embodiments are described in the dependent claims.

SHORT DESCRIPTION OF THE FIGURES

In the following the invention shall be explained using the embodying examples in conjunction with the drawings. The drawings show:

FIG. 1 in a longitudinal cut an injection molding tool according to the state of the art exclusively with a sliding ring in a simplified representation;

FIG. 2*a*) in a longitudinal cut a detailed view in accordance with circle A in FIG. 1 of an injection molding tool with a bearing in a simplified representation,

*b*) cut through a CD produced in such a form,

*c*) cut through a DVD produced in such a form;

FIG. 3*a*) in a longitudinal cut a detailed view in accordance with circle A in FIG. 1 of an injection molding tool according to the invention in a simplified representation,

*b*) cut through a CD produced in such a form,

*c*) cut through a DVD in such a form; and

FIG. 4*a*) in a longitudinal cut a detailed view in accordance with circle A in FIG. 1 of a further injection molding tool according to the invention in a simplified representation,

*b*) cut through a CD produced in such a form,

*c*) cut through a DVD produced in such a form.

DETAILED DESCRIPTION OF THE PREFERRED EMBODIMENTS

In FIG. 1 an injection molding tool according to the state of the art is shown in a longitudinal cut, as it is for example disclosed in EP-A1-1 120 221. The figure is simplified in so far as the representation of the necessary screws, springs, sealings and manipulation elements have been left out.

The injection molding tool 10, shown in a closed state, comprises, as main component, a first (left) mirror block 11, a second (right) mirror block 12 and a form ring (venting ring) 20, enclosing the first mirror block 11 concentrically, all of them together forming the cavity 25. The mirror blocks 11, 12 are fit into a centering ring 13,14, respectively, which concentrically enclose them. The information is embossed during the injection into the molded article (the CD/DVD) by means of a stamper 19, which as a thin disc is provided on the form surface of the second mirror block 12, and which in the central region is held by means of a bush-like stamper holder 18. For the connection of the injection molding tool 10 onto a nozzle of the (not displayed) injection molding machine, there is provided a sprue bush 17, which opens conically towards the outer side and which passes the centre of the second mirror block 12 into the cavity 25.

Opposite to the sprue bush 17 there are provided concentrically within each other and movable relative to each other (indicated by means of the double arrows) an ejector sleeve 16, a punch 15 and a sprue ejector 23. With the sprue ejector 23 it is possible to eject the sprue 22 remaining in the bore of the sprue bush. With the punch 15 the central opening of the injection molded CD is punched. With the ejector sleeve 16 finally the finished CD can be ejected after opening of the cavity 25.

The form ring 20 is mounted in the centering ring 13 such that it can be shifted and it is pressed towards the second mirror block 12 by means of springs (not displayed). It can be retracted by means of a pneumatically driven moving element 24. According to this state of the art the form ring 20 is not in direct contact with its inner side with the outer side of the first mirror block 11, but it is separated therefrom by means of a sliding ring 21, which is provided concentrically on the outer side of the first mirror block 11 in a specific offset. The sliding ring 21 substantially has the form of a hollow cylinder, and is for example made of copper. It therefore provides a thermally well conducting sliding bearing for the form ring 20 made of steel, and the first mirror block 11 also made of steel, wherein in the edge region of the cavity 25 an increased heat dissipation is provided and correspondingly improved optical and electrical values in the outer region of the CD. Due to the good sliding properties a relatively tight fit between the sliding ring 21 and the first mirror block 11 can be chosen.

In the context of such an injection molding tool 10 the invention shall now, by means of the detail region A as displayed in FIG. 1, be described in more detail. For simplification, in FIG. 2*a*) as well as in 3*a*) and 4*a*) the stamper has been omitted. It would be located between the second mirror block 12 and the cavity 25, and it would possibly at least partially also extend between the first mirror block 12 and the form ring 2.

Figure 2:
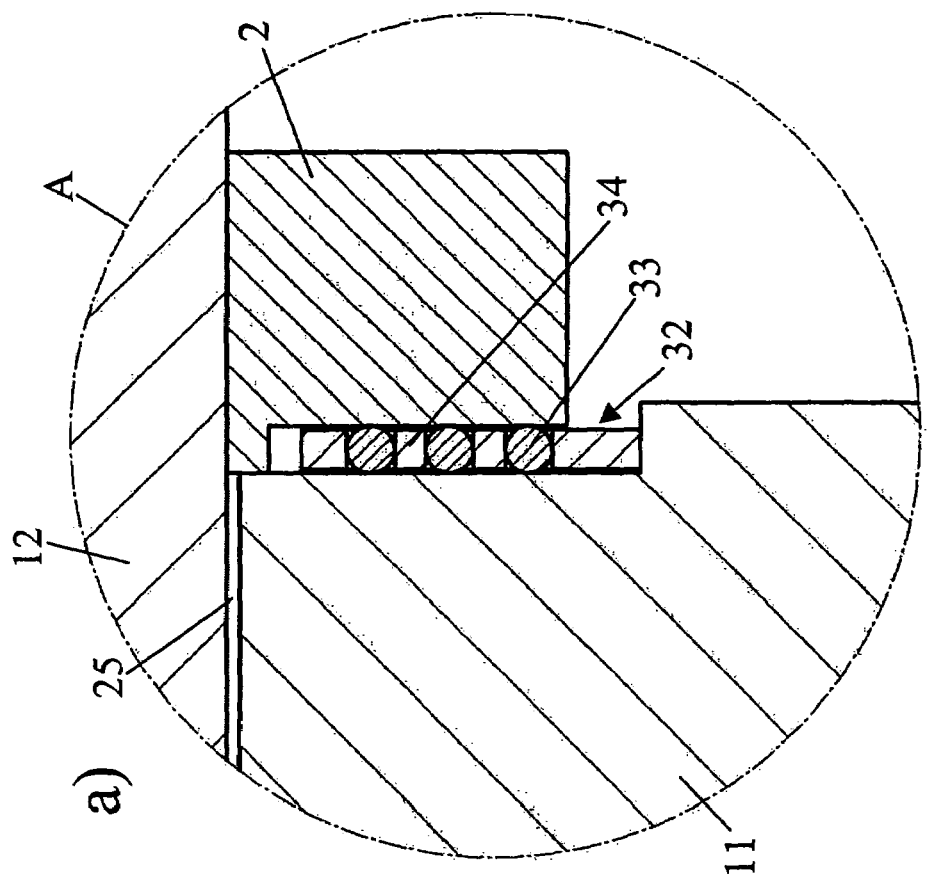
Figure 2:
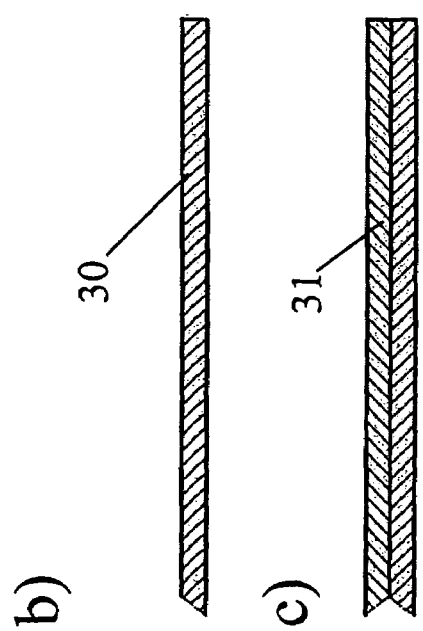

In FIG. 2*a*) a region of the form ring 2 is shown in detail. In the display according to FIG. 2 there is shown a solution in which only a bearing 32 is provided for the reduction of the sliding friction between the form ring 2 and the first mirror block 11. The bearing (in this case a ball bearing) is substantially provided at the same position as the sliding ring 21 in FIG. 1, in this case however due to the usually rather large play between the ball cage and the surrounding parts it is not possible to allow the bearing 32, in particular its ball cage 34, to border the actual cavity. Correspondingly, the form ring 2 itself borders the cavity 25 in the whole edge region, and in this edge region there is a zone, in which the form ring 2 is directly adjacent to the cylindrical outer surface of the mirror block 11. As already mentioned, the sliding friction between the mirror block 11 and the form ring shall be reduced, so this zone, in which as matter of course a very small play should be preset, is a disadvantage.

In FIGS. 2*b*) and *c*) there is shown a CD 30 and a DVD 31, respectively, in a cut view, as they are formed if an injection molding tool according to FIG. 2 is used.

In FIG. 3*a*) there is shown a solution according to the invention. A combination of a sliding ring 21 and of an additional bearing 32 (e.g. roller bearing) is used. The further bearing 32 is a ball cage 34 in which balls 33 are supported such that they can rotate, thus providing an easy relative axial motion of the mirror block 11 to the form ring 20. The two different means for the reduction of the friction during a motion of the form ring 20 relative to the first mirror block 11 are now provided coaxially, but they have different diameters. The mirror block 11 is provided with a stepped outer contour. In a first region 35 (first shoulder) which is facing the cavity 25, it has the smallest radius, and the sliding ring 21 is located enclosing this radius. At the subsequent slightly larger radius in the second region 36 (second shoulder) there is provided the further bearing 32 enclosing this larger radius.

Correspondingly the form ring 20 is provided with an adapted stepped inner contour, wherein in the region, in which the form ring 20 is enclosing the cavity in radial direction, a smaller radius c of 120 mm is provided, wherein this radius in a step enlarges to a larger radius b of 130 mm. The form ring 20 has an outer diameter of approximately 160 mm.

In order to have as tight a fit as possible between the individual elements, the sliding ring 21 is provided with a thickness d in radial direction of 0.5 mm (the thickness of the sliding ring is enlarged in the figures for better visualisation). The material of the sliding ring 21, which substantially has the form of a hollow cylinder, may be copper. It thus provides a thermally well conductive sliding bearing for the form ring 20 made of steel and for the first mirror block 11 also made of steel in the decisive region, namely in the edge region of the cavity. The thermal conductivity provides a better heat dissipation in this decisive zone and thus improved-optical and electrical values in the outer region of the CD and DVD, respectively. Due to the good sliding properties, a relatively tight fit between the sliding ring 21 and the first mirror block 11 can be chosen. In adaptation to the axial extension of the first step 35, the sliding ring 21 is provided with a height f in axial direction of approximately 6 mm.

Figure 3:
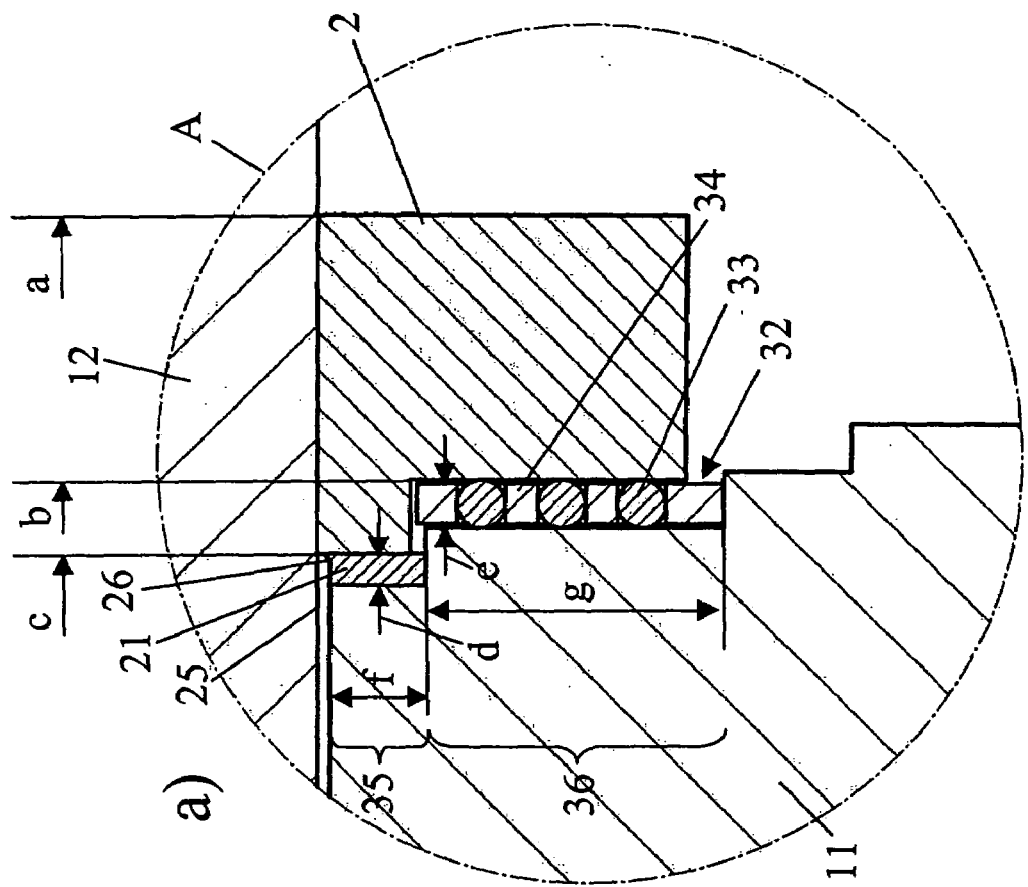
Figure 3:
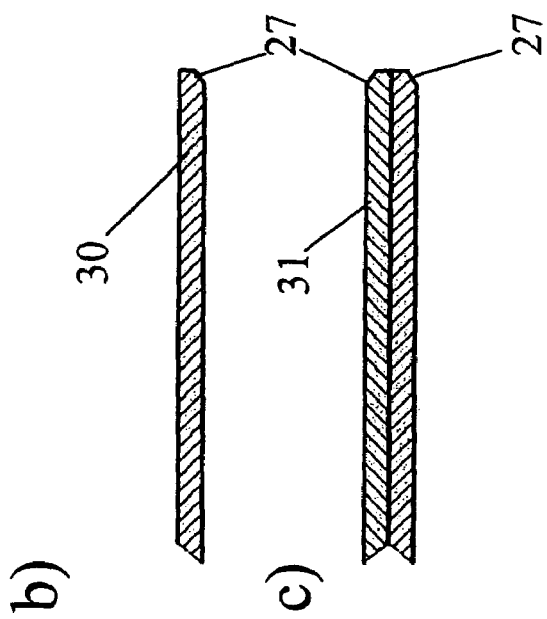

The upper edge of the sliding ring 21 which is facing the cavity may either be planar, and thus provide a continuation of the surface of the mirror block 11. In this case, the molded articles 30, 31 as displayed in FIG. 2b) and d) respectively, are made. In FIG. 3 the possibility is shown, to provide a sliding ring 21 with a chamfer 26. During the forming process in this case the formed article 30,31, respectively, is also provided with a chamfer 27, leading to a "softer" edge. The corresponding molded articles are shown in FIGS. 3b) and c).

Figure 4:
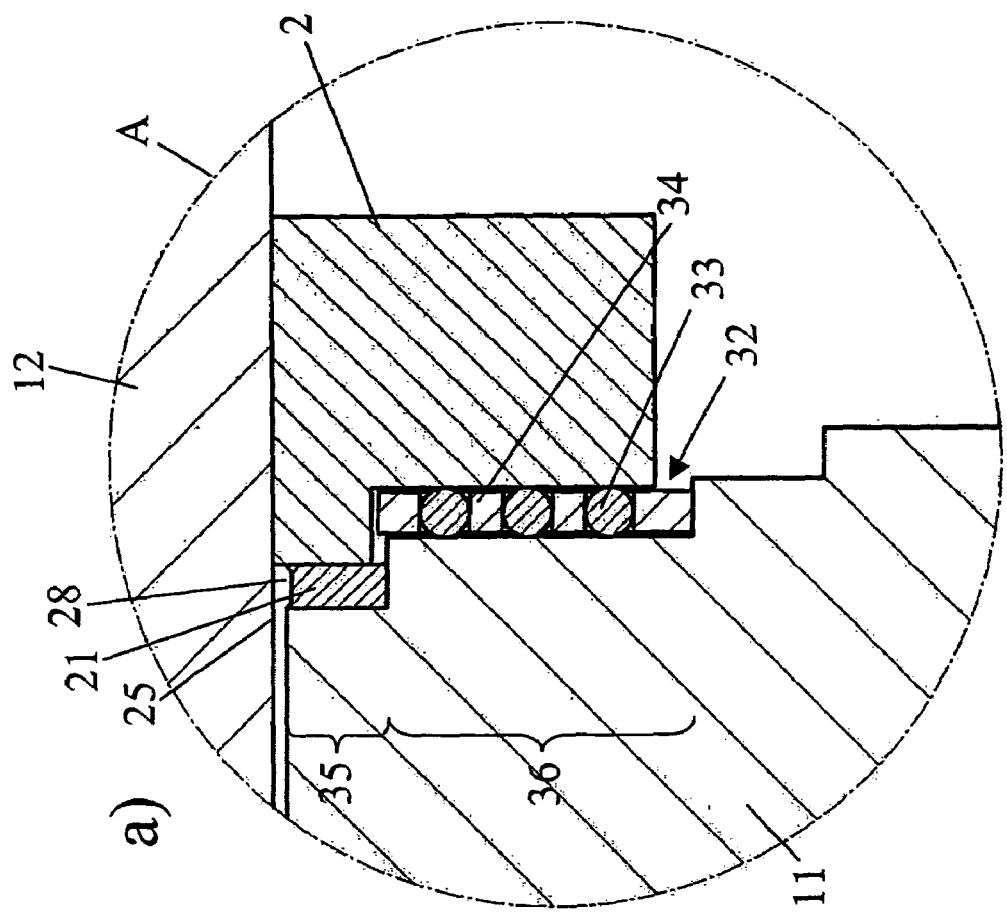
Figure 4:
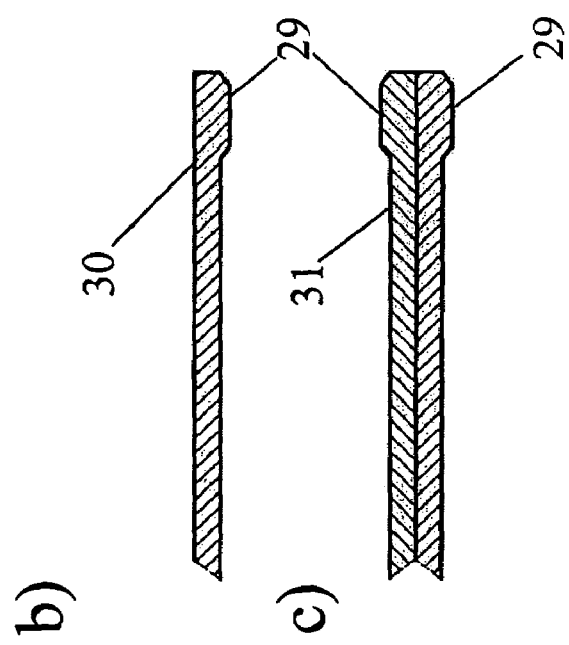

Another possibility is shown in FIG. 4. In this case the upper edge of the sliding ring 21 is provided with a circumferential recess 28. Accordingly during the injection molding a molded article 30, 31, respectively, is produced, which in its edge region is provided with a circumferential ridge 29, which may serve as a scratch protection. This situation is shown in FIGS. 4b) and c).

This shows that the upper edge of the sliding ring 21 may be designed differently and in accordance with the desired end form of the molded article, i.e. depending on how the edge region of the molded article shall be structured. Thereby round and edged forms or combinations thereof are possible, and it is even possible to structure the girth of the sliding ring along the edge region differently.

So the sliding ring 21 is exclusively located in the region, where his advantages are decisive, namely in the region which is bordering the cavity 25. In this region on the one hand as small as possible slot widths are desired and on the other hand an as high as possible heat conductivity between the form ring and the mirror block is provided in order to avoid differential thermal extensions of these elements. In addition to that it opens up the possibility to effect the above mentioned structuring of the form in the edge region of the molded article by means of a corresponding structuring of the sliding ring.

However in order to actually have the guidance function between the form ring 2 and the mirror block 11 not only by means of the sliding ring 21, in a farther region the guidance is provided by means of the further bearing 32. This is provided in the second step 36 in the mirror block 11, this second step is provided with a height g in axial direction of approximately 15 to 20 mm. The inner diameter of this second step is 124 mm, and for optimal interaction with the inner contour of the form ring 20 the bearing has a thickness e in radial direction of approximately 3 mm. The bearing 32 may have a height in axial direction, which height g corresponds to the height of the step 36 of the first mirror block 11, it is however, as displayed in FIGS. 3 and 4, respectively, also possible to make the bearing 32 somewhat higher.

The stepped location of sliding ring 21 and bearing 32 leads to the fact that if the form ring 20 in a representation according to FIG. 3 or 4 is mounted from the top onto the mirror block, as this is often the case during assembling or maintenance, first the bearing 32 is engaged by the outer contour of the second region 32, this before there is even the possibility that the critical region namely the sliding ring 21, the mirror block 11 in the edge region towards the cavity, the form ring 2 in the edge region to the cavity 25, respectively, get into contact. These regions are only guided together when a partial introduction of the bearing 32 has already taken place and when this correspondingly already provides guidance of these elements relative to each other. Like this it is prevented that the decisive edge regions in the edge zones of the cavity 25 can be damaged during maintenance and/or assembling.

To summarize due to the synergistic combination of sliding ring and bearing among others the following advantages are attained.

improved sliding properties between the mirror block and the form ring by means of separation of guidance to two different means with different properties.

accurate fit in the edge region of the cavity by means of the sliding ring.

good heat conductivity in the edge region of the cavity due to the sliding ring.

improved guidance in particular during mounting and maintenance, respectively, due to the relative provision of sliding ring and bearing and correspondingly reduced risk of damage of the decisive edge regions.

sliding ring variably eligible depending on the desired outer contour of the molded article, can easily be replaced.

if the injection molding form is damaged, very often the mirror blocks must be grinded and polished, and in case of damaged edge also this has to be machined, whereby for example also the outer diameter of the mirror block may change. The use of a sliding ring allows an easy replacement only of this element in this situation, and the complex form ring can be maintained and it need not be revised.

the guidance of the roller bearing is substantially free from play. In contrast to that, the sliding ring always needs a certain play in order not to jam during motion. Due to the combined use of those two elements, i.e. due to the fact that the guidance of the roller bearing is almost perfect, the play of the sliding ring can again be reduced substantially without however running the risk of jamming.

LIST OF REFERENCE NUMERALS 10 injection molding tool
11,12 mirror block
13,14 centering ring
15 punch
16 ejector sleeve 17 sprue bush
18 stamper holder
19 stamper
20 form ring or venting ring
21 sliding ring
22 sprue
23 sprue ejector
24 moving element (form ring)
25 cavity
26 chamfer
27 chamfer
28 recess (circumferential)
29 scratch protection
30 CD
31 DVD
32 bearing
33 balls
34 ball cage
35 first axial section of 11
36 second axial section of 11

The invention claimed is:

1. An injection molding tool for the production of disc shaped information carriers comprising:
   a) a first and a second mirror block for the formation of a cavity, which are located opposite to each other and which are movable relative to each other for the opening and the closure of the cavity;
   b) a form ring which encloses the first mirror block concentrically and which borders the cavity towards the outer edge, and which is movable relative to the first mirror block;
   c) wherein between the first mirror block and the form ring enclosing it means are provided for the reduction of friction during a motion of the form ring relative to the first mirror block;
   d) wherein the means comprise a sliding ring located concentrically between the first mirror block and the form ring enclosing it; and
   e) at least one additional bearing located concentrically between the first mirror block, wherein the form ring encloses the at least one additional bearing.

2. The injection molding tool according to claim 1, wherein the sliding ring is located in a region adjacent to the cavity, and wherein the at least one additional bearing is located in a region axially displaced from the cavity and not adjacent to the cavity.

3. The injection molding tool according to claim 1, wherein the sliding ring and the at least one additional bearing are located offset in a radial direction.

4. The injection molding tool according to claim 3, wherein the first mirror block comprises a first axial section which is facing the cavity and which has a first radius, and a second axial section which is farther from the cavity and which has a second radius, wherein the first radius is smaller than the second radius, wherein the sliding ring is located around the first axial section and wherein the further bearing is located around the second axial section.

5. The injection molding tool according to claim 4, wherein the sliding ring has a diameter (c) which corresponds substantially to the outer diameter of the cavity, and wherein the thickness (d) of the sliding ring is smaller than the difference between the first radius and the second radius.

6. The injection molding tool according to claim 5, wherein the sliding ring has a thickness (d) in the range of 0.25–2 mm and wherein the difference between the first radius and the second radius is in the range of 0.5–10 mm.

7. The injection molding tool according to claim 4, wherein the first axial section has a height (f), which is smaller than the height (g) of the second axial section.

8. The injection molding tool according to claim 4, wherein the first axial section has a height (f) in the range of 2.5–15 mm and wherein the second axial section has a height (g) in the range of 10–30 mm.

9. The injection molding tool according to claim 1, wherein the at least one additional bearing is a roller bearing.

10. The injection molding tool according to claim 1, wherein the at least one additional bearing has a thickness in the range of 1–5 mm.

11. The injection molding tool according to claim 1, wherein the sliding ring is made of a material reducing the sliding friction.

12. The injection molding tool according to claim 1, wherein the first mirror block borders the cavity with a substantially planar surface, and wherein the sliding ring with its front surface facing the cavity is flush with the planar surface of the first mirror block and enlarges it radially outward.

13. The injection molding tool according to claim 1, wherein the first mirror block borders the cavity with a substantially planar surface, and wherein the sliding ring has a front portion facing the cavity provided with a chamfer, such that the information carrier produced in the cavity provides a chamfer on its outer edge.

14. The injection molding tool according to claim 1, wherein the sliding ring sits on the first mirror block.

15. The injection molding tool according to claim 1, wherein the sliding ring and/or the at least one additional bearing is provided with a coating for reducing friction.

16. The injection molding tool according to claim 1, wherein the information carriers are one from the group of CDs or DVDs.

17. The injection molding tool according to claim 6, wherein the sliding ring has a thickness (d) in the range of 0.35–1 mm.

18. The injection molding tool according to claim 6, wherein the difference between the first radius and the second radius is in the range of 0–7.5 mm.

19. The injection molding tool according to claim 8, wherein the first axial section has a height (f) in the range of 5–10 mm.

20. The injection molding tool according to claim 8, wherein the second axial section has a height (h) in the range of 15–20 mm.

21. The injection molding tool according to claim 9, wherein the roller bearing is a ball bearing consisting of a ball cage with balls supported therein.

22. The injection molding tool according to claim 10, wherein the at least one additional bearing has a thickness in the range of 1.5–3.5 mm.

23. The injection molding tool according to claim 11, wherein the material is one from the group consisting of copper, a copper alloy and plastic.

24. The injection molding tool according to claim 11, wherein the material is Teflon.

25. The injection molding tool according to claim 1, wherein the first mirror block borders the cavity with a substantially planar surface, and wherein the sliding ring has a front portion facing the cavity and comprises a circumferential recess, such that the information carrier produced in the cavity on its outer edge is provided with a protruding ring-like scratch protector.

* * * * *